United States Patent [19]
Dausch

[11] Patent Number: 5,904,617
[45] Date of Patent: May 18, 1999

[54] AIR DUCT FOR A MOTOR VEHICLE DASHBOARD

[75] Inventor: Uwe Dausch, Le Mesnil St. Denis, France

[73] Assignee: Valeo Climatisation, La Verriere, France

[21] Appl. No.: 08/985,096

[22] Filed: Dec. 4, 1997

[30] Foreign Application Priority Data

Apr. 12, 1996 [FR] France ................................. 96 14879

[51] Int. Cl.$^6$ ........................................................ B60H 1/26
[52] U.S. Cl. ........................... 454/69; 264/318; 264/336; 264/DIG. 58; 454/121; 454/143
[58] Field of Search .............................. 454/69, 121, 124, 454/127, 137, 143, 144, 152; 264/318, 334, 336, 438, DIG. 58

[56] References Cited

U.S. PATENT DOCUMENTS

| | | | |
|---|---|---|---|
| 3,987,144 | 10/1976 | Nickold | 264/318 |
| 4,536,364 | 8/1985 | Lindskog | 264/227 |
| 5,383,815 | 1/1995 | Kiesel et al. | 454/137 |

FOREIGN PATENT DOCUMENTS

| | | |
|---|---|---|
| 25 41 373 | 3/1977 | Germany . |
| 37 02 629 | 11/1988 | Germany . |
| 38 18 666 | 12/1988 | Germany . |

OTHER PUBLICATIONS

French Search Report dated Sep. 18, 1997.
Patent Abstracts of Japan, vol. 013, no. 033 (M–789), Jan. 25, 1989 & JP 63 242736 A (Kanto Seiki Co. Ltd.), Oct. 7, 1988.

*Primary Examiner*—Harold Joyce
*Attorney, Agent, or Firm*—Morgan & Finnegan, LLP

[57] ABSTRACT

A motor vehicle dashboard has a support face. Air ducts are carried by the dashboard for taking air into the cabin of the vehicle. Each duct has a longitudinal slot which is bounded by two adjacent edges, so that the duct has a transverse cross section in the form of an open annulus. The duct has two external engagement faces on either side of the longitudinal slot, and is fixed to the support face of the dashboard by means of these engagement faces. The duct is made by moulding in a suitable deformable material such that it can be stripped from the mould by opening out the slot, after which the slot is closed up again.

21 Claims, 2 Drawing Sheets

AIR DUCT FOR A MOTOR VEHICLE DASHBOARD

FIELD OF THE INVENTION

This invention relates to air ducts, or pipes, adapted to be fitted in a dashboard of a motor vehicle, and to methods of making such air ducts.

BACKGROUND OF THE INVENTION

Conventionally, a motor vehicle dashboard contains at least one duct for air distribution, which is arranged to be supplied with a stream of processed air from an apparatus for heating and ventilation, and/or air conditioning, and to deliver this processed air to various vents which are located in selected positions in the cabin of the vehicle. The vents usually consist of de-icing vents for de-icing and demisting of the windshield, and often also the front side windows of the vehicle. The vents also usually include vents disposed on the front of the dashboard, including side vents and at least central vent, for the purpose of supplying ventilating air to the cabin.

Most vehicle dashboard of known types contain a plurality of air ducts, which are generally made of plastics material and which are interposed between the heating and ventilating (and/or air conditioning) apparatus and the various vents. The de-icing and demisting vents are usually supplied with air through ducts of plastics material which are secured below the armature of the moulded dashboard, and which are connected to a diffuser, again of plastics material, which is also fixed under the armature of the dashboard, the diffuser being arranged to be connected to the outlet of the heating and ventilating (and/or air conditioning) apparatus.

Similarly, the ventilating air vents are generally supplied with air through further ducts, again of plastics material, which are assembled together mechanically and fixed under the armature of the dashboard, these ducts being connected to another diffuser.

Thus, diffusion of the air within the known types of dashboard makes it necessary to provide a multiplicity of air ducts and duct connections which are interposed between the heating and ventilating (and/or air conditioning) apparatus and the various outlet vents. This leads to a number of disadvantages, and in particular the possibility of leaks at various joints, air noise due to vibration of the walls of the ducts, heat losses, aerodynamic losses, the need to provide a large number of components, occupation of large amount of space within the dashboard, and finally the fact that the fitting procedure is both long and complicated. These various disadvantages result in high manufacturing cost and operational inefficiency.

It is also known, from German patent specification No. DE-3 818 666, to provide a vehicle dashboard in which an air distribution duct is incorporated in the dashboard itself. This duct is made in the form of a single component which is fixed on the top of the dashboard. This known arrangement does reduce the number of components required, but at the same time still has most of the disadvantages listed above.

Up to the present time all attempts to make a dashboard which incorporates one or more air ducts in the dashboard itself have been unsuccessful, due in particular to the problems involved in operations of moulding the hollow parts, the shapes of which are complex.

DISCUSSION OF THE INVENTION

An object of the invention is to provide an air duct for a vehicle dashboard which overcomes the above mentioned disadvantages.

According to the invention in a first aspect, an air duct for a vehicle dashboard is characterised in that it includes a longitudinal slot bounded by two adjacent edges so that the duct has a transverse cross section in the form of an open annulus, together with two engagement faces which are formed externally on either side of the longitudinal slot, the engagement faces being adapted to be fixed to a support face of the dashboard, and the duct is formed by moulding in deformable material such as to enable the duct to be stripped from the mould by opening up the longitudinal slot.

Thus, the air duct of the invention is made in the form of a slotted (and therefore open) pipe of a deformable material which is capable of being moulded to the desired form and subsequently stripped from the mould by opening out the slot in the duct. In this connection, with regard to the deformation and flexibility properties of the material used in the moulding operation, it is possible to strip the moulded component from the mould by applying an appropriate force to open out the longitudinal duct temporarily, with the edges of the slot then being brought closer together so that the duct can be fixed to the dashboard.

According to a preferred feature of the invention, the two engagement faces are defined by two substantially coplanar wings of the duct, which extend on either side of the slot, the transverse cross section of the duct being substantially in the form of the Greek letter Omega ($\Omega$). The two wings provide extended contact surfaces which provide a good connection between the air duct and the support face of the dashboard, while also ensuring proper sealing of the air duct.

According to another preferred feature of the invention, the edges of the slot are substantially juxtaposed, so that the duct can be fixed to the dashboard. This restoration of the two edges of the slot to their original close relative position can be obtained, either naturally because the selected material has suitable reversible elastic properties, or by applying appropriate mechanical action on the moulded component.

In order to improve the sealing effect, it is preferable that the edges of the slot should be in actual contact with each other when the duct is fixed on the dashboard.

According to a further preferred feature of the invention, the duct has a configuration which is matched to that of the dashboard. This recognises that the invention enables the duct to be given a complex form which closely fits the dashboard, so that it can be fitted in the latter, and that the transverse cross section of the duct can be varied appropriately along the length of the duct.

According to yet another preferred feature of the invention, the deformable material is a plastics material. In this connection, the plastics material is preferably a foamed material, that is to say a material which is both deformable and a thermal insulator.

According to the invention in a second aspect, the invention provides a method of making an air duct according to the invention in its first aspect, this duct having a predetermined external profile and a predetermined internal profile.

In one form of this method of the invention, the method consists essentially of the following operations;

(a) providing a mould comprising a male part and a female part, the combined parts being adapted to define a mould cavity matched to the external form of the duct, the male part including a mould core matched to the internal form of the duct and attached to a narrow longitudinal web;

(b) injecting a moulding material between the female part and the male part of the mould, to fill the mould cavity and form a duct of open annular cross section, defining a longitudinal slot corresponding to the web;

(c) separating the male part and the female part of the mould from each other; and (d) stripping the duct from the mould by opening up the slot so as to extract the mould core. This is an injection moulding process carried out in a closed mould.

In another form of the method according to the invention, the method consists essentially of the following operations:

(a) providing a mould comprising a male part and a female part, the combined parts being adapted to define a mould cavity matched to the external form of the duct, the male part including a mould core matched to the internal form of the duct and attached to a narrow longitudinal web;

(b) injecting the moulding material into a channel of the female part while the male part and the female part of the mould are still spaced away from each other;

(c) bringing the female part and the male part of the mould together to close the mould, whereby the moulding material fills the mould cavity and forms a duct of open annular cross section defining a longitudinal slot corresponding to the web;

(d) separating the male part and the female part of the mould from each other; and (e) stripping the duct from the mould by opening up the slot so as to extract the mould core.

In this version, the method involves an injection moulding process of the open mould type.

With either version of the method of the invention, it is possible to make an air duct having predetermined external and internal profiles, using a mould which consists of complementary male and female parts, the male part including a mould core which is matched to the internal profile of the duct.

In the step of stripping the product from the mould, the mould core is not extracted, because it remains a fixed part of the male part of the mould. Stripping is carried out by applying a suitable force to deform the duct by opening out the longitudinal slot, taking advantage of the deformation properties of the moulding material. In this connection, it is sufficient to deform the duct just enough to enable the latter to be removed past the mould core (or to enable the mould core to be removed from the interior of the duct).

In this connection also, it will be realized that the manufacture of a similar duct not having the longitudinal slot would not be possible with a conventional moulding process because extraction of the mould core in the axial direction of the duct would be impossible.

In preferred embodiments of the method, according to the invention, the female part of the mould includes a channel open in an outer face of the female part, the male part comprises a cover body adapted to come into contact with the external face of the female part, the mould core of the male part is attached to the cover body by the web. Thus, the male part of the mould comprises a body portion or cover body because the male part is in effect a cover part of the mould, with the mould core being joined to the cover body through the web.

According to another feature of the method of the invention, the moulding material is a plastics material, which is preferably a foamed material.

Preferably, the method of the invention further includes, prior to the injection operation (b), an intermediate operation consisting in placing a film around the mould core and the web of the male part of the mould, and/or around the channel of the female part. This film remains in place after the stripping operation, and provides an overlay on appropriate surfaces interior of the duct, while also improving sealing, especially in the case where the moulding material is a foamed plastics material which is not generally leakproof.

According to the invention in a third aspect, a vehicle dashboard includes at least one air duct according to the first aspect of the invention, and/or made by a method according to the second aspect of the invention, with the air duct being fixed to a support face of the dashboard.

The air duct is preferably fixed to the dashboard by adhesive bonding, though in another version it may for example be secured by ultrasonic welding. Alternatively, other suitable fastening means may be used, in particular mechanical fasteners.

Further features and advantages of the invention will appear more clearly on a reading of the following detailed description of some preferred embodiments of the invention, which is given by way of non-limiting example only and with reference to the accompanying drawings.

DESCRIPTION OF PREFERRED EMBODIMENTS OF THE INVENTION

Figure 1:
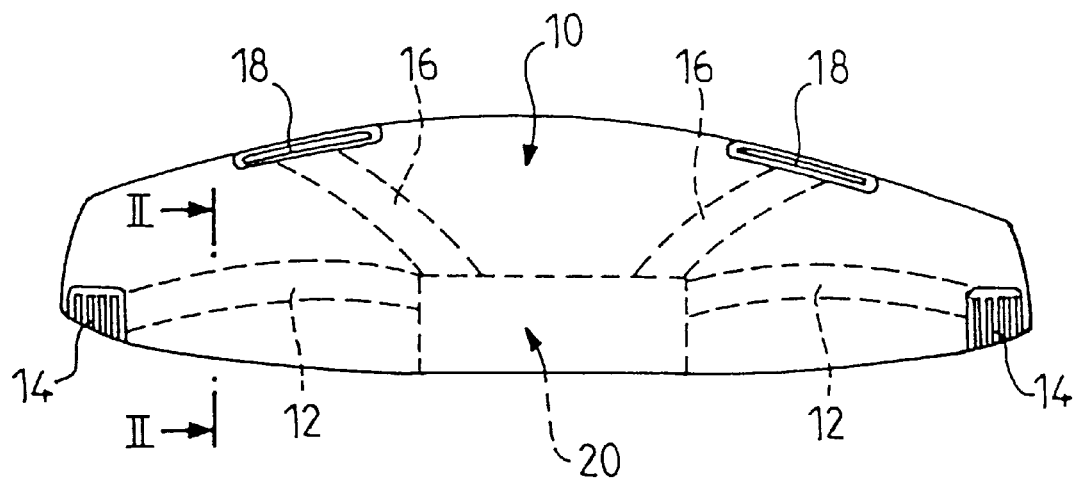
FIG. 1 is a top plan view of the dashboard or fascia of a motor vehicle, containing air ducts in accordance with the invention.

Reference is first made to FIG. 1, which shows a dashboard 10 of a motor vehicle, containing two air ducts 12 or ventilation ducts, leading to vents 14, each of which is arranged at a respective one of the ends of the dashboard. The dashboard also contains two further air ducts 16 or de-icing ducts, which lead to two corresponding vents 18 for the purpose of de-icing and/or demisting the windshield (not shown) of the vehicle. The two ventilating ducts 12 and the two de-icing ducts 16 are supplied with air from a heating and ventilating unit 20 which is disposed below the dashboard, either in the engine compartment or in the cabin of the vehicle.

The unit 20 includes regulating means and distributing means, for delivering treated air into the ventilating and de-icing ducts 12 and 16 as required by the user of the vehicle. The forms of the various ducts are somewhat complex, because of various design constraints, and particularly availability of space, caused by different pieces of equipment mounted below the dashboard.

Figure 2:
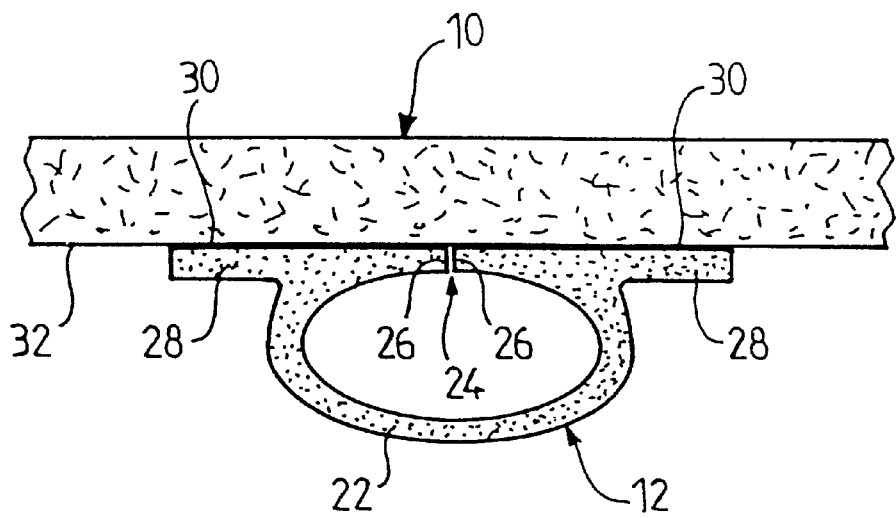
FIG. 2 is a partial view on an enlarged scale, in cross section taken on the line II—II in FIG. 1.

Reference is now made to FIG. 2, which shows the structure of the air duct, in this case more particularly the ventilation duct 12 arranged on the left hand side of the dashboard 10. The duct 12 shown in FIG. 2 includes a wall 22 having a transverse cross section in the form of an open annulus. The wall 22 is interrupted by a longitudinal slot 24, bounded by two adjacent edges 26 which are close to each other and which may be in contact with each other. In addition, the duct 12 has two substantially coplanar wings 28 which are joined to the wall 22 and which extend on either side of the slot 24. These two wings 28 have two engagement faces 30 which are adapted to be fixed to a support face 32 of the dashboard 10. In this example, this support face is a lower face of the dashboard 10.

The ventilating duct 12 has a generally curved shape as shown in FIG. 1, to enable the air vent 14 to be connected by the air duct to the heating and ventilating unit 20. The transverse cross section of the air duct 12 is, at least in the plane of cross section II-2, of substantially oval form. This form of the cross section can be varied over the length of the duct, according to the various design requirements arising from the presence of various instruments or other items of equipment mounted in the dashboard.

The ventilating duct 12 is formed by moulding in a deformable material, so as to give it, in particular, properties of flexibility such as to permit manufacture by moulding in the deformable material, followed by an operation of stripping it from the mould, in which the slot 24 is opened up as will be seen later herein.

When the ventilating duct 12 is fixed to the dashboard 10, the engagement faces 30 are fitted closely to the support face 32, which enables any leakage of air through the longitudinal slot to be avoided. As a result, the edges 26 of the slot do not have to be in contact with each other, although such contact is preferred to reinforce the sealing effect.

Figure 3:
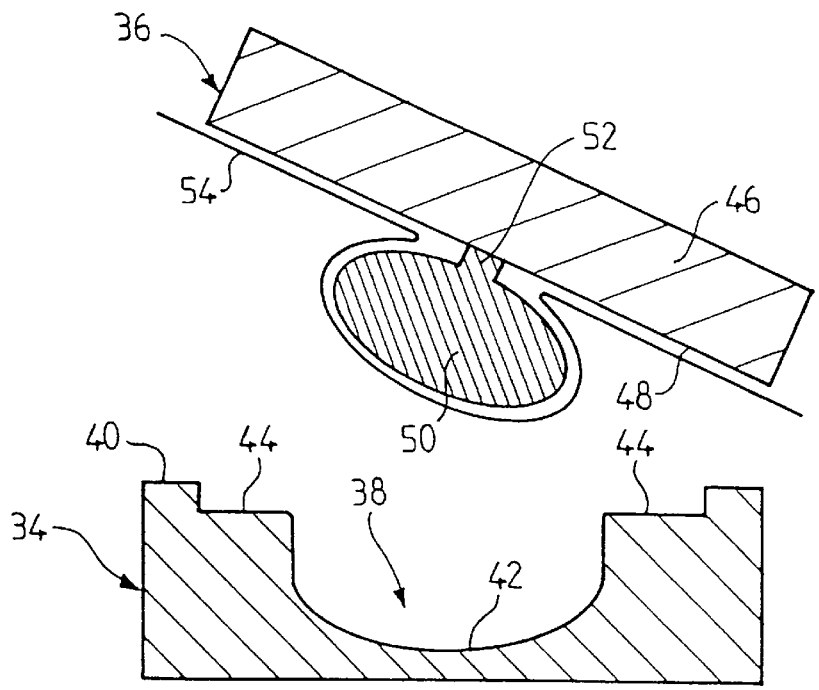
FIGS. 3, 4 and 5 show three successive phases in the manufacture of a duct according to the invention, by moulding in a two-part mould.
Figure 4:
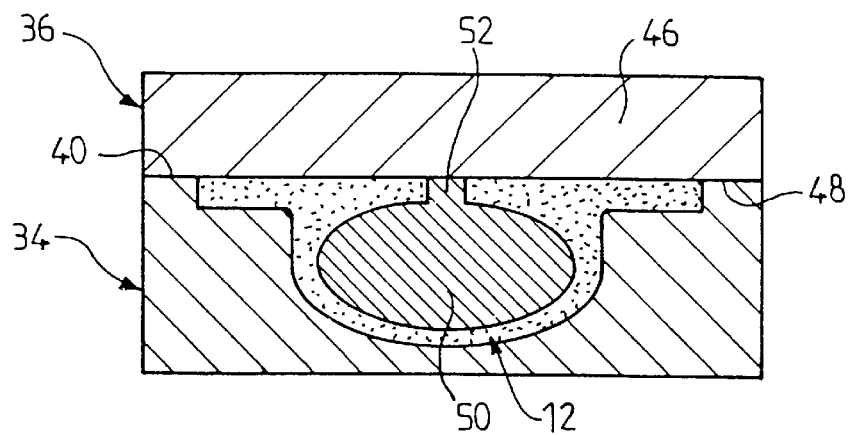
Figure 5:
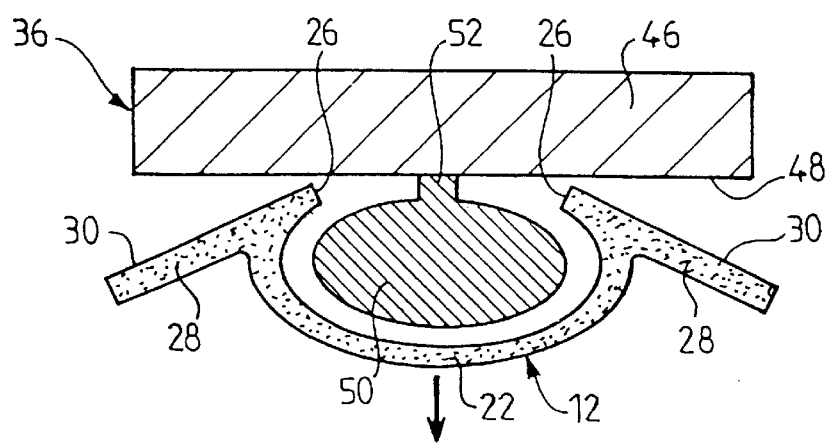

Reference is now made to FIGS. 3 to 5, for a description of a method of manufacture of an air duct 12 in accordance with the invention. This process is effected by moulding, using a two-part mould comprising a female part 34, also referred to as a mould base, and a male part 36, also referred to as a cover.

The female part 34 is formed with a channel 38 which is open in an outer face 40 or upper face of the part 34. The channel 38 has a form which partly corresponds to the external form of the duct 12 to be moulded. The channel has a base 42, the right cross section of which corresponds substantially to the form of a half oval. This rounded base 42 is open into two side cavities 44 in which the wings 28 are formed.

The male part 36 of the mould, or cover, consists of a cover body 46 which has an outer face 48 that bears against the upper face 40 of the female part 34, for moulding and for forming the engagement faces 30 of the wings 28. In addition the male part 36 includes a mould core 50, the shape of which corresponds to the internal form of the duct to be moulded. The mould core 50 is attached to the cover body 46 through a narrow longitudinal web 52.

Prior to the moulding operation, a film 54 may be used for coating the mould core 50, the two sides of the web 52 and the external face 48 of the male part 36 of the mould, and/or the surface of the channel 38 in the female part, with its base 42 and its two side cavities 44. The two mould parts 34 and 38 are then brought together so as to put the external faces 40 and 48 into contact with each other as shown in FIG. 4. Once the two mould parts have been brought together in this way, a mould cavity exists, having a form matched to that of the duct to be formed and including the channel 38.

All that then that needs to be done is to inject moulding material into this mould cavity, so as to fill the latter and so form the duct by an injection moulding process. The resulting duct has a cross section in the form of an open annulus, with a slot which is defined by the presence of the web 52 of the male mould part 36.

This is a closed mould process, but, in an alternative version of the method, the mould can be left open, with moulding material being injected into the channel 38, after which the male part 36, is placed on the female part, to close the mould and thus fill the mould cavity.

Stripping of the duct from the mould takes place in the following way. The male and female parts of the mould are separated as shown in FIG. 5. After this separation, the duct 12 is still fixed with respect to the male part 36 of the mould. All that is then necessary, however, is to deform the duct 12 so as to open up the slot 24 as shown in FIG. 5, until its width is at least equal to that of the mould core 50. This opening up of the slot is facilitated by the deformable nature of the material used, and by the fact that it is possible to use the wings 38 for pulling the moulding 12 apart in this way.

The two edges 26 of the slot 24 are then brought towards each other, either automatically if a resiliently deformable material is used, or by force positively applied externally if the material used is not elastic.

The moulding material is preferably a foam of plastics material, preferably of a closed pore type, for example of a polyurethane. This material may with advantage form either an external or an internal skin. The duct can then be fixed to the dashboard in any appropriate way.

Although mechanical means may be used, it is preferable to secure the duct to the dashboard, either by adhesive bonding or by ultrasonic welding, although any other suitable means may be used.

The moulding method of the invention enables ducts of various forms to be formed so that they can offer non-linear, or sinuous, paths for the air, with a transverse cross section which is either of constant form or varying form.

It is also possible to arrange that the slot in the duct has locally widened portions so as to provide a natural outlet into a further air outlet vent.

What is claimed is;

1. An air duct for a vehicle dashboard having a support face, the air duct including a wall having a transverse cross section in the form of an annulus including two adjacent terminal edges defining a longitudinal slot for interrupting the annulus, the duct further having two external engagement faces on each side of the slot for securing the duct to said support face, two substantially coplanar wings extending from each side of the slot, the wings having the engagement faces, and the duct being moulded in a deformable material to enable the duct to be stripped from a mould by opening the slot.

2. An air duct according to claim 1, wherein the edges of the slot are close to each other for securing the duct to the dashboard.

3. An air duct according to claim 1, wherein the duct is configured to match the configuration of the dashboard.

4. An air duct according to claim 1, wherein the deformable material is a plastic material.

5. An air duct according to claim 1, wherein the deformable material is a foamed plastic material.

6. A method of moulding an air duct according to claim 1 with given external and internal profiles, the method comprising the steps of;

(a) providing a mould comprising a male part and a female part, the combined male and female parts defining a mould cavity matched to the external form of the duct to be moulded, the male part including a mould core corresponding to the internal form of the duct to be moulded and a narrow longitudinal web joined to the core, the female part having a channel that partly defines the mould cavity;

(b) injecting a moulding material between the mould parts so that the moulding material fills the mould cavity and forms a duct of open annular across section with the web forming a longitudinal slot interrupting the annular cross section;

(c) separating the male part from the female part; and (d) opening out the slot and stripping the duct from the mould with relative movement of the mould core out of the duct through the opened-out slot.

7. A method of moulding an air duct according to claim 1 with given external and internal profiles, the method comprising the steps of;

(a) providing a mould comprising a male part and a female part, the combined male and female parts defining a mould cavity matched to the external form of the duct to be moulded, the male part including a mould core corresponding to the internal form of the duct to be moulded, the male part including a mould core corresponding to the internal form of the duct to be moulded and a narrow longitudinal web joined to the core, the female part having a channel for partly defining the mould cavity;

(b) separately the male and female parts;

(c) injecting a moulding material into the channel of the female part;

(d) bringing the male and female parts of the mould together to close the mould so that the moulding material fills the mould cavity and forms a duct of open annular cross section, the web forming a longitudinal slot interrupting the annular cross section;

(e) separating the male part from the female part; and (f) opening out the slot, and stripping the duct from the mould with relative movement of the mould core out of the duct via the opened-out slot.

8. A method according to claim 6, wherein the female mould part has an external face and a channel open in the external face, the male part comprising a cover body for contact with the external face of the female part, and the web joining the mould core to the cover body.

9. A method according to claim 6, wherein the moulding material is a plastics material.

10. A method according to claim 6, wherein the moulding material is a foamed plastics material.

11. A method according to claim 6, further including the step, prior to step (b), of placing a film around at least one element of the mould selected from the group consisting of the mould core, the web, and the channel of the female mould part.

12. A vehicle dashboard including at least one air duct according to claim 1, the dashboard having a support face and the air duct being secured to the support face.

13. A dashboard according to claim 12, wherein the duct is adhesively bonded to the dashboard.

14. A dashboard according to claim 12, wherein the air duct is secured to the dashboard by ultrasonic welding.

15. A method according to claim 7, wherein the female mould part has an external face and a channel open in the said external face, the male part comprising a cover body for contact with the external face of the female part, and the said web joining the mould core to the cover body.

16. A method according to claim 7, wherein the moulding material is a plastics material.

17. A method according to claim 7, wherein the moulding material is a foamed plastics material.

18. A method according to claim 7, further including the step, prior to step (b), of placing a film around at least one element of the mould selected from the group consisting of the mould core, the said web, and the channel of the female mould part.

19. An air duct according to claim 1, wherein the wall has a transverse cross section of a substantially oral foam.

20. An air duct according to claim 1, wherein the foam of the wall is variable.

21. An air duct according to claim 1, wherein the engagement faces closely secured to the support face for preventing of air through the slot.

* * * * *